(12) United States Patent
Wang et al.

(10) Patent No.: US 10,146,379 B2
(45) Date of Patent: Dec. 4, 2018

(54) TOUCH SCREEN CAPABLE OF DETECTING TOUCH PRESSURE AND A SYSTEM OF CONTROLLING THE SAME

(71) Applicant: HIMAX TECHNOLOGIES LIMITED, Tainan (TW)

(72) Inventors: Hui-Min Wang, Tainan (TW); Yaw-Guang Chang, Tainan (TW)

(73) Assignee: Himax Technologies Limited, Tainan (TW)

(*) Notice: Subject to any disclaimer, the term of this patent is extended or adjusted under 35 U.S.C. 154(b) by 46 days.

(21) Appl. No.: 15/097,232

(22) Filed: Apr. 12, 2016

(65) Prior Publication Data

US 2017/0147102 A1    May 25, 2017

Related U.S. Application Data

(60) Provisional application No. 62/258,958, filed on Nov. 23, 2015.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0414* (2013.01); *G06F 3/0416* (2013.01); *G06F 2203/04105* (2013.01)

(58) Field of Classification Search
CPC ....... G06F 3/044; G06F 3/0412; G06F 3/0414
See application file for complete search history.

(56) References Cited

U.S. PATENT DOCUMENTS

| 2010/0141574 | A1* | 6/2010 | Jung | G06F 3/0346 345/156 |
| 2015/0331508 | A1* | 11/2015 | Nho | G06F 3/0421 345/173 |
| 2015/0338950 | A1* | 11/2015 | Ningrat | G06F 3/03545 345/174 |
| 2017/0075493 | A1* | 3/2017 | Lee | G06F 3/0418 |
| 2017/0090644 | A1* | 3/2017 | Yao | G06F 3/0416 |

FOREIGN PATENT DOCUMENTS

| TW | 201426458 A | 7/2014 |
| TW | 201437890 A | 10/2014 |
| TW | 201525809 A | 7/2015 |

OTHER PUBLICATIONS

Office Action dated Dec. 9, 2016 in corresponding Taiwan Patent Application No. 105111544.

\* cited by examiner

*Primary Examiner* — Chun-Nan Lin
(74) *Attorney, Agent, or Firm* — Donald E. Stout; Stout, Uxa & Buyan, LLP

(57) ABSTRACT

A touch screen includes a display, a touch sensor disposed above or within the display, and a conductive layer disposed under the display for detecting pressure.

14 Claims, 5 Drawing Sheets

100

13

TOUCH SCREEN CAPABLE OF DETECTING TOUCH PRESSURE AND A SYSTEM OF CONTROLLING THE SAME

CROSS-REFERENCE TO RELATED APPLICATIONS

This application claims the benefit of U.S. Provisional Application No. 62/258,958, filed on Nov. 23, 2015, the entire contents of which are herein expressly incorporated by reference.

BACKGROUND OF THE INVENTION

1. Field of the Invention

The present invention generally relates to a touch screen, and more particularly to a touch screen capable of detecting touch pressure.

2. Description of Related Art

A touch screen is an input/output device that combines touch technology and display technology to enable users to directly interact with what is displayed.

Conventional touch screens are able to detect touch positions, i.e., x-y coordinates of a touch event in two dimensions. However, the conventional touch screens are unable to detect touch pressure, i.e., the magnitude of a touch force (i.e., z-coordinate) in three-dimensional manner.

Some touch screens capable of detecting touch pressure are proposed by adding a force-sensitive layer or structure, which is usually composed of multiple layers and need be elaborately manufactured. Other touch screens capable of detecting touch pressure are implemented by software.

For the reason that the conventional touch screens could not be effectively manufactured to detect touch pressure in addition to detecting touch positions, a need has arisen to propose a novel scheme to improve the touch screens.

SUMMARY OF THE INVENTION

In view of the foregoing, it is an object of the embodiment of the present invention to provide a touch screen with capability of detecting touch pressure without using a force-sensitive or pressure-sensitive layer to simplify manufacturing process.

According to one embodiment, a touch screen includes an organic light-emitting diode (OLED) display, a touch sensor disposed above or within the OLED display, and a conductive layer disposed under the OLED display for detecting pressure.

According to another embodiment, a system of controlling a touch screen includes a display driver and a touch driver. The display driver provides a display signal to a display of the touch screen. The touch driver detects touch pressure by analyzing an induced signal received from a conductive layer disposed under the display. A capacitance between the display and the conductive layer is affected by touch pressure and revealed in the induced signal.

DETAILED DESCRIPTION OF THE INVENTION

Figure 1A:
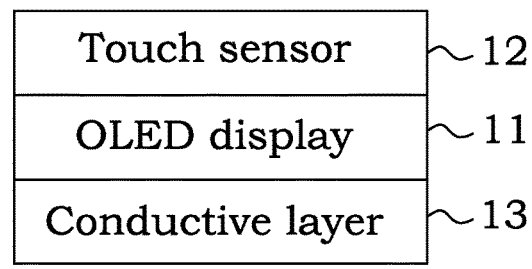
FIG. 1A shows a simplified cross-sectional view of a touch screen with capability of detecting touch pressure according to one embodiment of the present invention.

FIG. 1A shows a simplified cross-sectional view of a touch screen 100 with capability of detecting touch pressure according to one embodiment of the present invention. The term touch screen in the specification may refer to a conventional rigid touch screen, or may refer to a flexible touch screen incorporating a flexible plastic substrate, enabling the touch screen to be bent or rolled while still operating. The touch screen 100 of the embodiment may include an organic light-emitting diode (OLED) display 11, and a touch sensor 12 disposed above or within the OLED display 11. The touch sensor 12 may, for example, be a capacitive touch sensor that utilizes capacitive coupling effect to detect touch positions.

According to one aspect of the embodiment, the touch screen 100 may further include a conductive layer 13 that is disposed under the OLED display 11, and is configured to detect touch pressure. In the embodiment, the conductive layer 13 is consisted of a single layer that may be made up of, for example, metallic material such as copper, or may be made up of conductive alloy. For brevity, only primary layers pertinent to the embodiment are shown in FIG. 1A. It is appreciated that an additional layer or layers, when needed, may be disposed between the OLED display 11 and the touch sensor 12, or between the OLED display 11 and the conductive layer 13. An additional layer, for example, cover glass (not shown), may be disposed over the touch sensor 12.

Figure 1B:
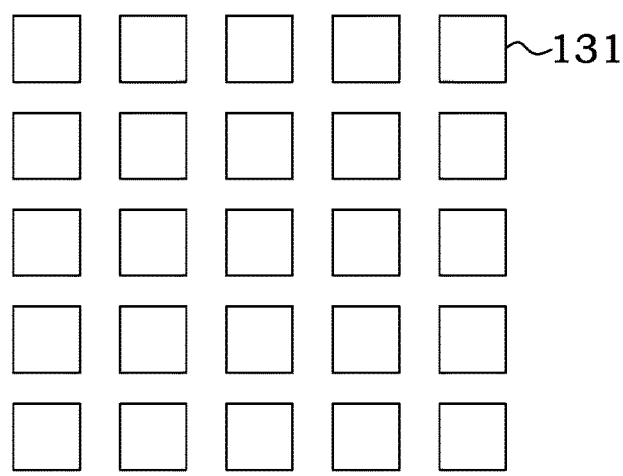
FIG. 1B schematically shows a top view of an exemplary conductive layer of FIG. 1A.

FIG. 1B schematically shows a top view of an exemplary conductive layer 13 of FIG. 1A. Specifically, the conductive layer 13 comprises a plurality of conductive blocks 131 arranged in matrix form. Although square conductive blocks 131 in matrix form are demonstrated in FIG. 1B, other shapes and configurations may be used instead.

Figure 2A:
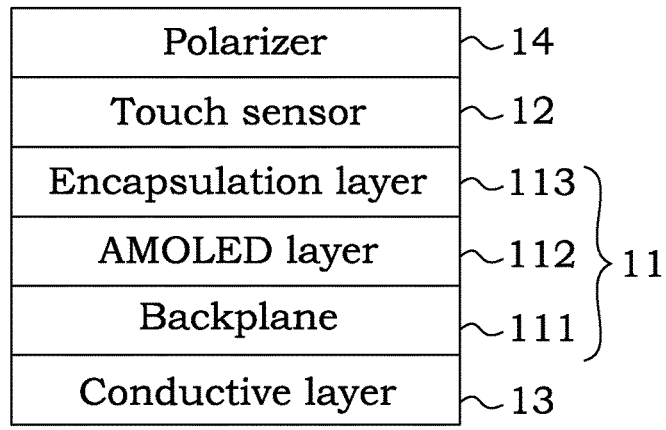
FIG. 2A shows a cross-sectional view of an exemplary touch screen of FIG. 1A.
Figure 2B:
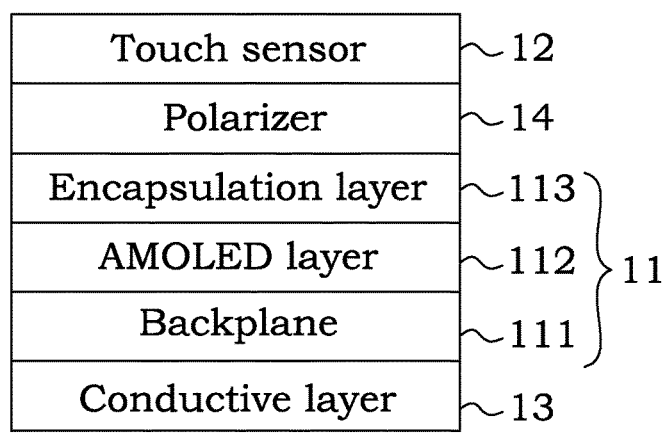
FIG. 2B shows a cross-sectional view of another exemplary touch screen of FIG. 1A.

FIG. 2A shows a cross-sectional view of an exemplary touch screen 100 of FIG. 1A. Specifically, the OLED display 11 may include, from bottom up, a backplane 111, an active-matrix OLED (AMOLED) layer 112 and an encapsulation layer 113. The backplane 111 may include thin-film transistors (TFTs) to switch individual pixels on or off. In the exemplary embodiment, the touch sensor 12 is disposed below a polarizer 14, and the touch sensor 12 is disposed between the polarizer 14 and the encapsulation layer 113. In an alternative exemplary embodiment, as shown in FIG. 2B, the touch sensor 12 is disposed above the polarizer 14, and the polarizer 14 is disposed between the touch sensor 12 and the encapsulation layer 113.

Figure 3:
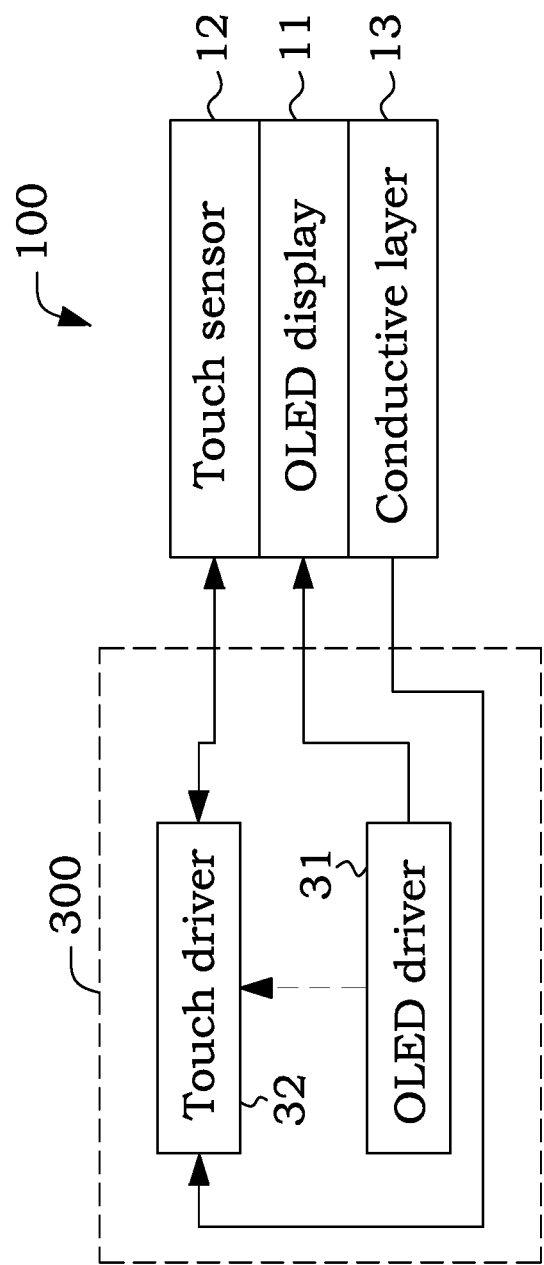
FIG. 3 shows a block diagram illustrating a system of controlling the touch screen of FIG. 1A according to one embodiment of the present invention.

FIG. 3 shows a block diagram illustrating a system 300 of controlling the touch screen 100 of FIG. 1A according to one embodiment of the present invention. In the embodiment, the system 300 may include an OLED driver 31 that is configured to provide the OLED display 11 with suitable display signals to make the OLED display 11 show desired image.

The system 300 of the embodiment may also include a touch driver 32 that is configured to detect touch positions. In addition, according to one aspect of the embodiment, the touch driver 32 is configured to detect touch pressure by analyzing signals received from the conductive layer 13 while the OLED display 11 is performing display operation. The OLED driver 31 and the touch driver 32 may be physically integrated in an integrated circuit (IC), or may be physically manufactured in separate ICs respectively.

Figure 4:
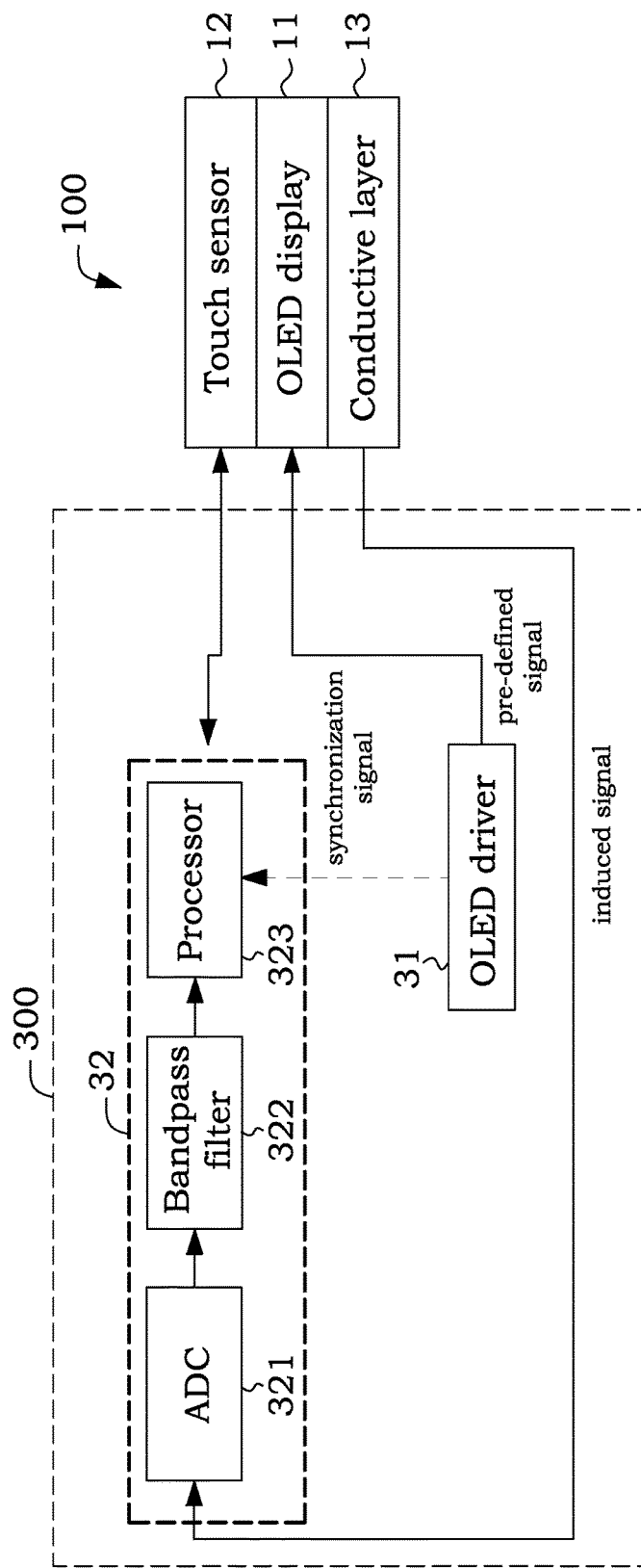
FIG. 4 shows a detailed block diagram illustrating a system of controlling the touch screen of FIG. 3.
Figure 5:
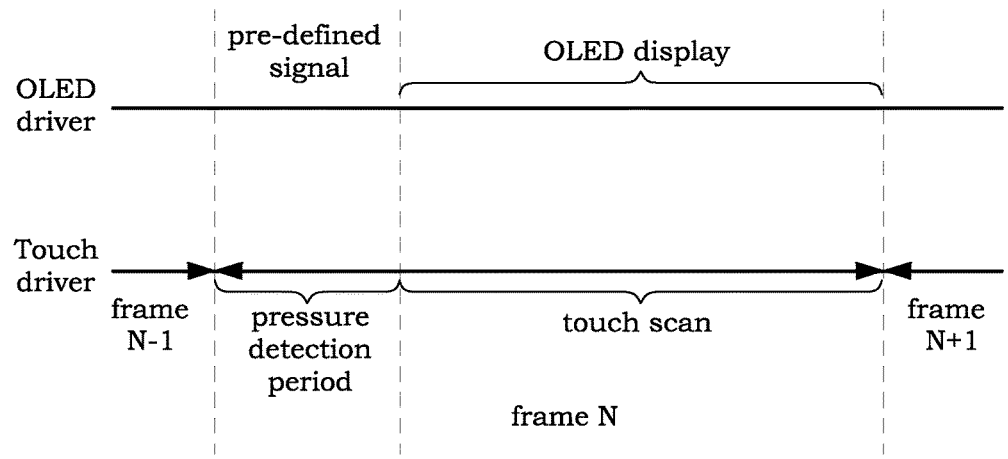
FIG. 5 and FIG. 6 show timing diagrams accompanying FIG. 4.

FIG. 4 shows a detailed block diagram illustrating a system 300 of controlling the touch screen 100 of FIG. 3, and FIG. 5 shows a timing diagram accompanying FIG. 4. Specifically speaking, the OLED driver 31 provides a pre-defined signal to the OLED display 11 in a pressure detection period, for example, located in a start portion (or slot) of each display frame as exemplified in FIG. 5. It is appreciated that the pressure detection period may be located in other portion or portions (e.g., a stop portion or an intermediate portion) of each display frame. The pre-defined signal affects the underlying conductive layer 13, thereby generating an induced signal on the conductive layer 13. The induced signal is then fed to the touch driver 32 for analysis. As the pressure affects (e.g., increases) a capacitance between the AMOLED layer 112 and the conductive layer 13 and is accordingly revealed in the induced signal, the touch driver 32 can thus detect touch pressure, for example, according to a peak tone (i.e., a tone with the maximum amplitude) of the induced signal. The conductive layer 13 of the embodiment is distinct from the force-sensitive structure used in conventional 3D touch screens at least for the characteristics that the conductive layer 13 itself is not force-sensitive or pressure-sensitive. Instead, the conductive layer 13 of the embodiment is composed of a plain conductive (e.g., metallic) layer. It is the capacitance existed between the AMOLED layer 112 and the conductive layer 13 that is sensitive to touch pressure to be detected.

As exemplified in FIG. 4, the touch driver 32 of the embodiment may include an analog-to-digital converter (ADC) 321 that is configured to receive the induced signal and accordingly output a digital equivalent of the induced signal. The digital equivalent of the induced signal is then fed to a bandpass filter 322 that passes frequencies within a certain range (e.g., 10 kHz to 100 kHz) and rejects (or attenuates) frequencies outside that range, thereby generating a bandpass signal. A digital programmable bandpass filter may be used such that the pass band may be dynamically adjusted. The bandpass signal is then fed to a processor 323 (e.g., a digital signal processor or DSP) that is configured to analyze the frequency content of the bandpass signal. Accordingly, touch pressure may be determined, for example, according the peak tone of the bandpass signal. It is noted that the ADC 321 should be disposed between the bandpass filter 322 and the processor 323 instead, if an analog bandpass filter, rather than a digital programmable bandpass filter, is used.

Still referred to FIG. 4 and FIG. 5, the OLED driver 31 sends a synchronization signal (e.g., a vertical synchronization signal or VSYNC) to the touch driver 32 (e.g., the processor 325), for example, at the beginning of the pressure detection period. Accordingly, the OLED driver 31 and the touch driver 32 can operate in unison.

Figure 6:
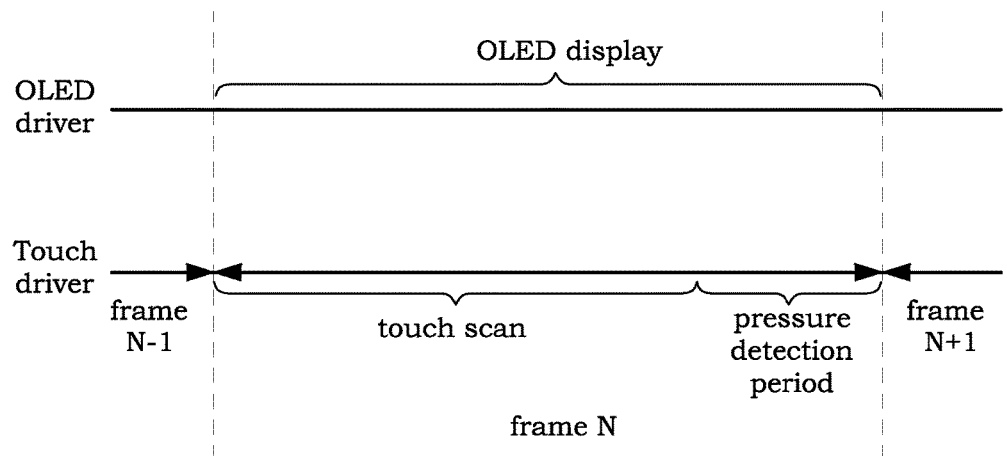

FIG. 6 shows a timing diagram accompanying FIG. 4 according to another embodiment of the present invention. In the embodiment, no synchronization is sent. Instead, the touch driver 32 (e.g., the bandpass filter 322) may determine synchronization between the touch driver 32 and the OLED driver 31, for example, by using phase lock technique.

Although specific embodiments have been illustrated and described, it will be appreciated by those skilled in the art that various modifications may be made without departing from the scope of the present invention, which is intended to be limited solely by the appended claims.

What is claimed is:

1. A touch screen, comprising:
    an organic light-emitting diode (OLED) display including an active-matrix OLED (AMOLED) layer;
    a touch sensor capable of detecting touch positions disposed above or within the OLED display; and
    a conductive layer disposed under the OLED display and the touch sensor for detecting pressure;
    wherein, in a pressure detection period, the OLED display is driven by an OLED driver with a signal, and a capacitance between the AMOLED layer and the conductive layer is affected by touch pressure and revealed in an induced signal received from the conductive layer, said signal driving the OLED display affecting the conductive layer and accordingly generating the induced signal on the conductive layer.

2. The touch screen of claim 1, wherein the conductive layer comprises a plurality of conductive blocks.

3. The touch screen of claim 1, wherein the OLED display comprises:
    a backplane;
    the active-matrix OLED (AMOLED) layer disposed above the backplane; and
    an encapsulation layer disposed above the AMOLED layer.

4. The touch screen of claim 3, wherein the backplane comprises thin-film transistors (TFTs) to switch individual pixels on or off.

5. The touch screen of claim 1, further comprising a polarizer disposed above the touch sensor, or disposed between the touch sensor and the OLED display.

6. The touch screen of claim 1, comprising no force-sensitive structure.

7. The touch screen of claim 1, wherein the conductive layer is consisted of a single layer.

8. A system of controlling a touch screen, comprising:
    an organic light-emitting diode (OLED) driver providing a display signal to an OLED display of the touch screen, the touch screen including a touch sensor capable of detecting touch positions, the OLED display including an active-matrix OLED (AMOLED) layer; and
    a touch driver detecting touch pressure by analyzing an induced signal received from a conductive layer disposed under the OLED display and the touch sensor;
    wherein, in a pressure detection period, the OLED driver provides a signal to drive the OLED display, and a capacitance between the AMOLED layer and the conductive layer is affected by touch pressure and revealed in the induced signal, said signal driving the OLED display affecting the conductive layer and accordingly generating the induced signal on the conductive layer.

9. The system of claim 8, wherein the touch driver comprises:
    a bandpass filter receiving the induced signal, thereby generating a bandpass signal; and
    a processor analyzing frequency content of the bandpass signal to determine the touch pressure according a peak tone of the bandpass signal.

10. The system of claim 9, the touch driver further comprising an analog-to-digital converter (ADC) disposed in front of the bandpass filter, or disposed between the bandpass filter and the processor.

11. The system of claim 9, wherein the touch driver is synchronized with the OLED driver by the bandpass filter.

12. The system of claim 8, wherein the conductive layer comprises a plurality of conductive blocks.

13. The system of claim 8, wherein the OLED driver provides said signal to the OLED display in a pressure detection period of the touch driver.

14. The system of claim 8, wherein the display driver sends a synchronization signal to the touch driver during a pressure detection period of the touch driver.

* * * * *